J. W. MOAKLER.
DRIVING MECHANISM FOR MOTOR VEHICLES.
APPLICATION FILED APR. 23, 1921.
1,438,051.
Patented Dec. 5, 1922.
2 SHEETS—SHEET 2.
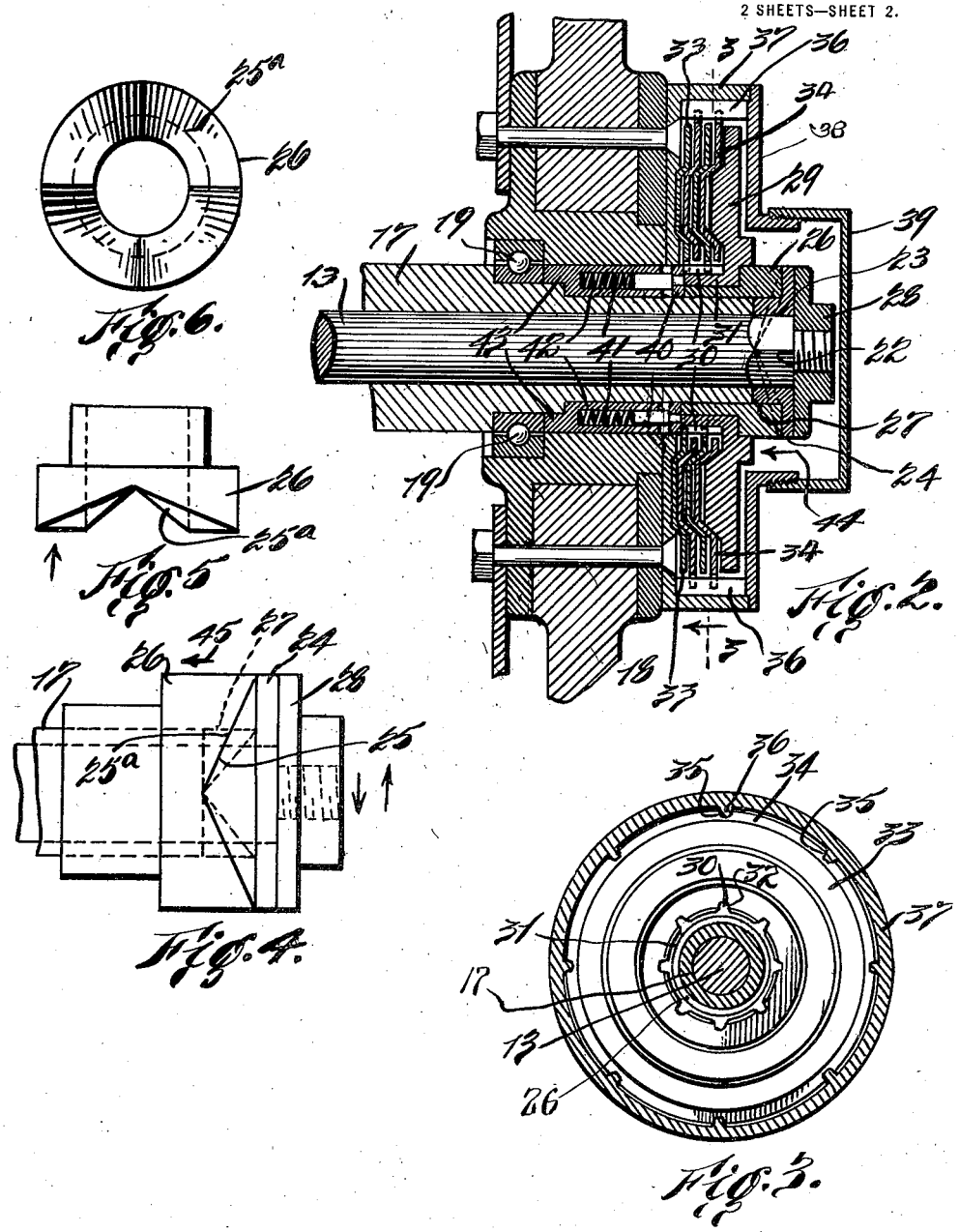
INVENTOR
John W. Moakler
BY
Maurice Block
ATTORNEY Patented Dec. 5, 1922.

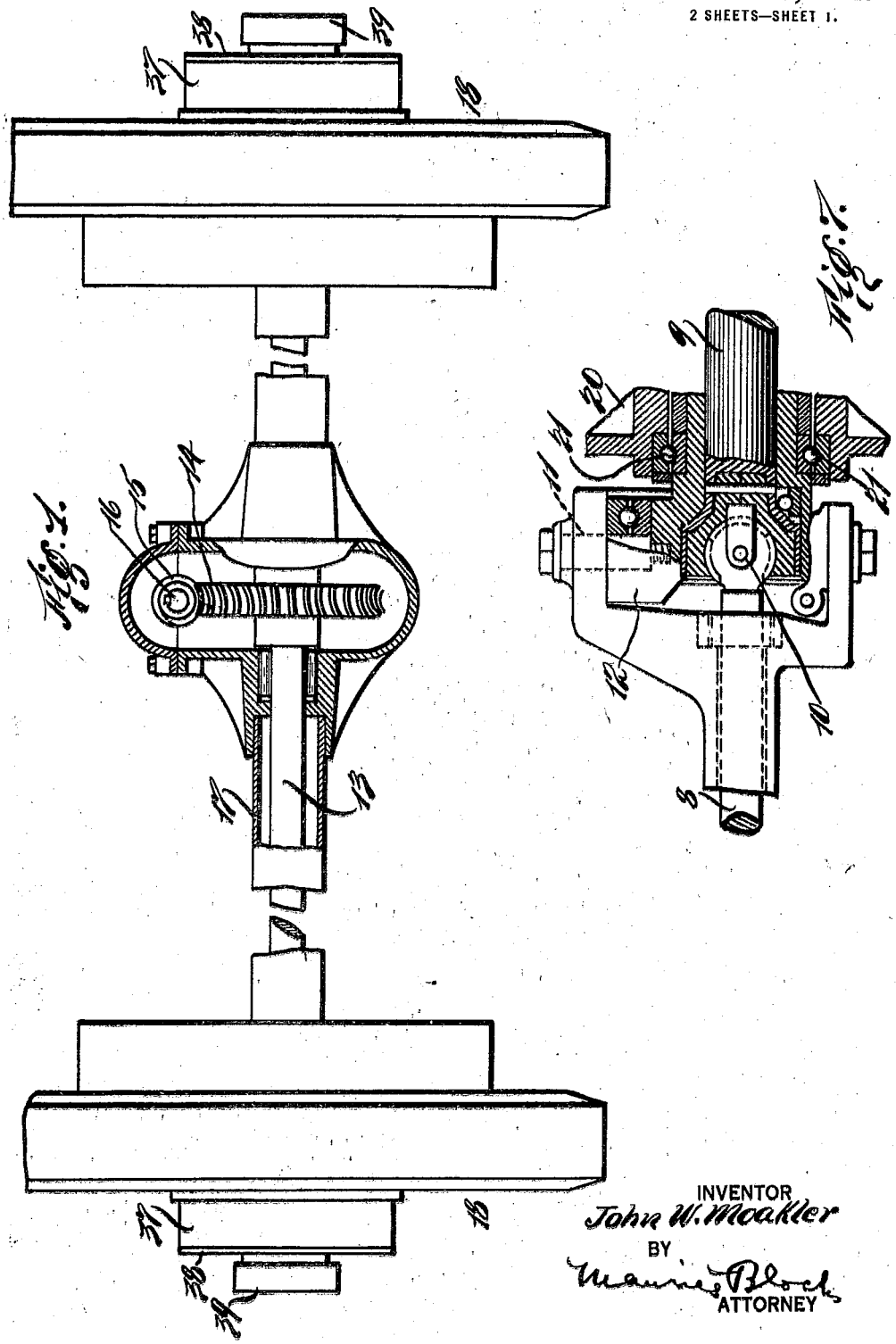

1,438,051

UNITED STATES PATENT OFFICE.

JOHN WM. MOAKLER, OF EAST WORCESTER, NEW YORK.

DRIVING MECHANISM FOR MOTOR VEHICLES.

Application filed April 23, 1921. Serial No. 463,933.

*To all whom it may concern:*

Be it known that I, JOHN W. MOAKLER, citizen of the United States, residing at East Worcester, in the county of Otsego and State of New York, have invented certain new and useful Improvements in Driving Mechanism for Motor Vehicles, of which the following is a specification.

This invention relates to improvements in mechanism for driving motor vehicles, and more particularly to a special frictional clutch device arranged to positively connect the wheels of the vehicle and the axle.

To carry my invention into practice, I employ a solid or one-piece axle upon which the wheels are loosely mounted, that is to say, the wheels are not directly connected to the axle. To transmit power from the axle to the wheels I employ a frictional clutch mechanism and means to cause said clutch mechanism to rotate the wheels.

I will now proceed to describe my invention in detail, the novel features of which I will point out in the appended claims, reference being had to the accompanying drawings, forming part hereof, wherein:—

Fig. 1 is a rear view, partly in section, of the rear axle of a motor vehicle embodying my invention. Fig. 2 is an enlarged sectional detail view of the hub of one of the wheels, the wheel proper being broken off. Fig. 3 is a sectional view, on a reduced scale, the section being taken on the broken line 3—3 in Fig. 2. Fig. 4 is an enlarged detail view of one end of the axle and also of one of the clutch operating devices. Fig. 5 is a detail edge view of the female clutch operating devices. Fig. 6 is an end view thereof, looking in the direction of the arrow in Fig. 5. Fig. 7 is a sectional view illustrating my improvement as applied to a front drive axle for vehicles having a four wheel drive.

Throughout the description and drawings the same number is used to refer to the same part.

My improved driving mechanism is applicable to a vehicle having a four wheel drive as well as to a vehicle having the usual rear wheel drive. A vehicle having both front and rear wheels driven by front and rear axles will have a solid axle in the rear and a three-part axle at the front, both axles being connected to the motive power. In this event the front axle will consist of a solid main axle 8 as shown in Fig. 7, and two stub axles such as the stub axle 9, one only being shown, the stub axles 9 and the main axle 8 being joined by a universal connection 10 of any suitable construction. The pivotal points of the connection of the universal joint will be coincident with the center line of the pivot 11 of the steering knuckle 12. It will be understood in Fig. 7 that the stub axle 9 has the same construction as the end of the axle 13 hereinbelow described and carries the same clutch and clutch operating elements as are illustrated in Fig. 2, and it is believed to be unnecessary to duplicate those parts in Fig. 7.

Referring now to Figs. 1 to 6 inclusive, a solid axle designated by number 13 carries in this instance a worm gear 14 having in mesh therewith a worm 15 carried by a driving shaft 16 connected to a suitable motor not shown.

As herein illustrated, the rear wheels 18 are carried by or supported by the bearings indicated generally by the number 17 upon suitable anti-friction devices 19, while the front wheels 20, if shaft driven, will be supported by the steering knuckle 12 upon suitable anti-friction bearings 21.

The outer ends of the axle 13 are squared, like the squared ends of the axle shown in Fig. 2 marked 22, and engage the squared openings 23 in a male cam member 24, having cam projections 25 which engage the correspondingly shaped sockets 25ª in a female member 26 slidably mounted upon the bearing 17 and upon the body portion 27 of the male cam member 24. A nut 28 serves to retain the male cam member upon the squared portion of the axle 13. The female cam member 26 carries a clutch plate 29 having projections or keys 30 upon the hub portion 31 thereof to engage recesses 32 in clutch disks 33, which are alternated with similar clutch disks 34 having recesses 35 to engage keys or projections 36 formed on the inner face of the clutch drum 37 secured to the wheel 18. It will be understood that the clutch plate 29 encircles the cylindrical sleeve portion of the female cam member 26 movably as shown in Fig. 2, and has a shoulder in contact with the said member on the right hand side whereby the movement of the cam member 26 to the left will correspondingly move the clutch member 29. The clutch mechanism is housed by the drum 37 and the cap members 38 and 39. The thrust block 40 bears against the end of the hub of the clutch plate 29, cam 26 and the adjacent clutch disk 33. The pressure upon the disks is limited by the contacting of the block 40 with the ends of the clutch plate 29 and cam 26. In other words, the thrust block 40 is forced by the springs 41 against the end of the hub of the clutch plate 29 and the cam 26, and also bears slightly against the adjacent clutch disk 33, the pressure upon the clutch disks depending upon the number of clutch disks employed. This arrangement maintains a slight frictional contact between the clutch disks, but permits of slippage. This slight frictional contact is sufficient to cause the cams to operate to increase the gripping of the disks when the axle is rotated. While the device is being assembled there will be enough clutch disks 33 and 34 employed to slightly more than fill the space between the clutch plate 29 and the end of its hub 31, and hence the innermost plate 33 will very slightly overlap the inner end of the hub 31. When the thrust block 40 and springs 41 are assembled, and nut 28 applied, the disks will be forced together until the block 40 strikes the end of the hub of the clutch plate and cam 26. Further pressure upon the disks will now cease, but the clutch disks will be maintained slightly in frictional contact.

The springs 41 are located within sockets 42 carried by a ring 43 rotatively mounted upon the bearing 17. The function of the cam member 24 is to force the cam member 26 in the direction of the arrows 44 in Fig. 2, and 45 in Fig. 4, so as to force the disks 33 and 34 against the clutch drum to positively connect the axle 13 and wheels 18, thereby compressing springs 41. The re-action of the springs 41 will release the clutch disks from the frictional contact with the drum whenever pressure has been removed therefrom.

When the axle is rotated either forward or backward to start the vehicle from a stationary position, the female cam member will be held against rotation by the friction of the clutch disks, hence the female cam member 26 will be forced in the direction of the arrows 44 and 45, thereby causing the clutch disks 33 and 34 to frictionally contact with the clutch drum, by which the wheels will be positively connected to the axle by the said clutch disks. It will be apparent that the power to cause the clutch disks to grip is supplied by the motor through the axle. When the motor is started ahead or rearwardly, the axle will, of course, be rotated by the motor, the rotation of the axle will cause the cam 26, which is frictionally held as above described, to connect the wheels and axle by riding up upon cam 24, hence the wheels will turn and continue to turn as long as power is applied to the said axle.

The tendency of the springs 41 will be to maintain the cam members 26 and 24 in frictional contact and in the relative positions indicated in Fig. 4. The springs will also maintain the clutch disks in frictional contact. When the cam members are in said position, the pressure on the clutch disks, being released from the clutch drum, will permit the disks to slip. When turning a corner the outer wheel will rotate faster than the inner wheel, hence the tendency will be to cause the clutch disks for the said inner wheel to grip even tighter than when the vehicle is following a straight course.

Having now described this invention and explained the mode of its operation, what I claim is:—

1. The combination of an axle, with a wheel loosely associated therewith, a clutch drum carried by the wheel, a plurality of clutch disks associated therewith, a clutch plate concentrically supported about the axle and slidable longitudinally with respect to the axle, a plurality of clutch disks associated therewith, said disks being alternated with the disks associated with the clutch drum, a female cam member connected to the said clutch plate, and a male cam member carried by the axle to operate said female cam member to cause said clutch disks to engage with the drum whereby said wheel and axle will be operatively connected.

2. The combination of an axle, with a bearing member therefor, a wheel loosely mounted on the bearing member but out of contact with the axle, a clutch drum carried by the wheel, a cam member the said bearing member surrounding the axle and supporting the said cam member concentrically with the axle, a clutch plate carried by the said cam member, clutch disks associated with the clutch drum and clutch plate, and means connected with the axle to impose sufficient pressure on the clutch plate to cause the wheel to be rotated by said axle.

3. The combination with an axle, of a bearing member therefor, a wheel loosely mounted on the bearing member but out of contact with the axle, a clutch drum carried by the wheel, a female cam member rotatively mounted upon the bearing member and adapted also for movement longitudinally thereof, a clutch plate carried by the female cam member, clutch disks associated with the said clutch drum and clutch plate, and a male cam member carried by the axle to operate the female cam member to cause the axle to rotate the wheel.

4. The combination of an axle, of a bearing member therefor, a ring surrounding the bearing member and provided with sockets, a wheel loosely mounted on said ring, a female cam member carried by the bearing, a clutch plate carried by the female cam member, a clutch drum carried by the wheel, clutch disks associated with the drum and plate, a male cam member carried by the axle arranged to operate the female cam member to cause the clutch disks to be forced into contact with each other, and springs located in the sockets in the said ring arranged to force the female cam member and disks to release positions.

5. In a driving mechanism of the character described, the combination with a driven axle, of a wheel revoluble about the axle, a clutch connected with the wheel and comprising members constructed to frictionally engage each other, a cam device having a member connected with the axle and a member connected with the clutch for operating the clutch by the rotation of the axle with respect to the wheel, and springs for releasing the clutch members and for maintaining a slight frictional contact between the clutch members when released.

6. In driving mechanism of the character described, the combination with a driven axle, of a wheel revoluble about the axle, a cam device having a member attached to the axle and a member movable upon the axle, a clutch having members engaging the wheel and members engaging the said movable cam member whereby the rotation of the axle with respect to the wheel causes the cam device and clutch to grip, and springs for releasing the clutch members, the said springs acting also upon the said clutch members to maintain a slight frictional contact between them when released.

In testimony whereof I affix my signature.

JOHN Wm. MOAKLER.